United States Patent [19]

Burge

[11] 4,188,051
[45] Feb. 12, 1980

[54] TUBE COUPLING

[75] Inventor: Donald G. Burge, Plainwell, Mich.

[73] Assignee: Parker-Hannifin Corporation, Cleveland, Ohio

[21] Appl. No.: 884,872

[22] Filed: Mar. 9, 1978

Related U.S. Application Data

[63] Continuation-in-part of Ser. No. 789,826, Apr. 22, 1977, abandoned.

[51] Int. Cl.² .............. F16L 17/02; F16L 21/08; F16L 33/16; F16L 37/08
[52] U.S. Cl. .................... 285/104; 285/105; 285/158; 285/249; 285/323; 285/342; 285/382.7
[58] Field of Search ............ 285/382.7, 341, 342, 285/104, 105, 248, 249, 250, 322, 323, 243, 158

[56] References Cited

U.S. PATENT DOCUMENTS

| 2,503,169 | 4/1950 | Phillips | 285/343 X |
| 2,806,538 | 9/1957 | Conrad | 285/322 X |
| 2,823,935 | 2/1958 | Wurzburger | 285/343 X |
| 3,164,361 | 1/1965 | Pruett | 285/322 X |
| 3,724,880 | 4/1973 | Seiler | 285/105 |
| 3,743,326 | 7/1973 | Courtot et al. | 285/105 |
| 3,970,337 | 7/1976 | Niemeyer | 285/382.7 X |
| 4,043,576 | 8/1977 | Reich et al. | 285/343 X |
| 4,136,896 | 1/1979 | Rodman et al. | 285/341 |

FOREIGN PATENT DOCUMENTS

| 2259850 | 6/1974 | Fed. Rep. of Germany | 285/343 |
| 2634348 | 2/1978 | Fed. Rep. of Germany | 285/343 |
| 2634349 | 2/1978 | Fed. Rep. of Germany | 285/343 |
| 735540 | 8/1932 | France | 285/323 |
| 7705253 | 11/1977 | Netherlands | 285/323 |

Primary Examiner—Mervin Stein
Assistant Examiner—Carl F. Pietruszka
Attorney, Agent, or Firm—John N. Wolfram

[57] ABSTRACT

A preassembled tube coupling into which a tube may be inserted and which automatically grips the tube to prevent withdrawal of the tube. The coupling includes a packing ring for sealing the tube, a sleeve with spring fingers to lightly grip the tube upon insertion of the latter, and a nut with a cam surface to contract the fingers into tight gripping engagement with the tube upon slight withdrawal motion of the tube.

6 Claims, 10 Drawing Figures

TUBE COUPLING

This application is a continuation in part of application Ser. No. 789,826 filed Apr. 22, 1977 now abandoned.

BACKGROUND OF THE INVENTION

For many tubing installations it is desirable to use a preassembled tube coupling into which the tube end may merely be inserted with no further operations, such as tightening a threaded nut, for making the joint tight and leakproof. This is particularly important in connection with assembly-line operations where tubes are being installed on truck air brake systems, automotive air conditioning systems, and the like.

SUMMARY OF THE INVENTION

The present invention provides a tube coupling that may be preassembled and into which it is merely necessary to insert a tube to achieve a tight leakproof joint and wherein the coupling will tightly grip the tube to prevent its withdrawal. The coupling includes a body containing a packing ring to seal the tube, a sleeve with spring fingers to grip the tube, and a nut to provide a cam surface for contracting the fingers against the tube upon slight withdrawal motion of the tube. The nut is threadedly engaged with the body and may be unthreaded therefrom so that the tube and sleeve may be withdrawn from the body when it is desired to uncouple the tube from the body. The body may be in the form of a cartridge that has either a thread for threading into a housing or a cylindrical surface to be press fitted into a housing.

DETAIL DESCRIPTION

Figure 1:
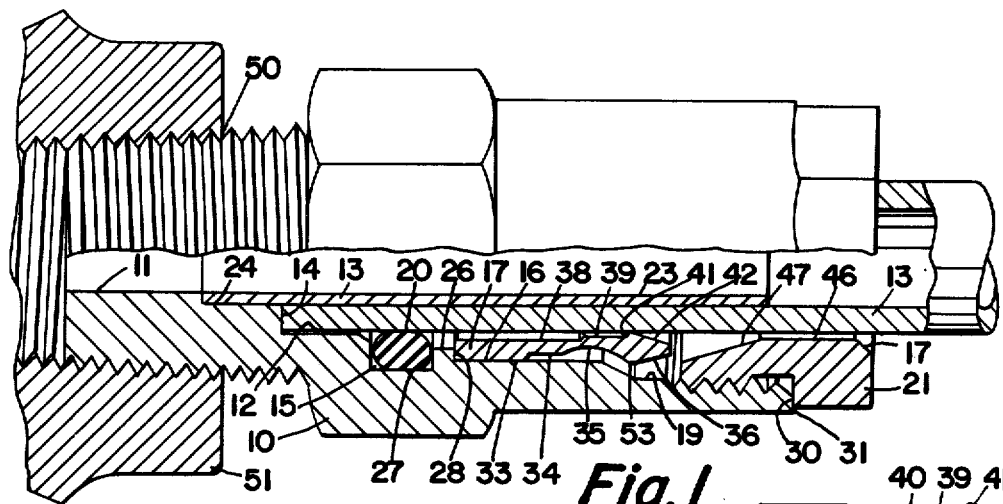
FIG. 1 is a view, partly in longitudinal cross section showing the coupling when the tube has been inserted.

The coupling comprises a body 10 having a flow passage 11, a first bore 12 for receiving a tube 13, an abutment shoulder 14 against which the inner end of the tube may be seated, a chamber 15 in which a resilient packing ring, such as O-ring 20, is located, a second bore 16 for receiving a sleeve 17, and an internally threaded bore 19 into which a nut 21 is threaded. A tubular member 23 is press fitted into another bore 24 to provide an internal support for tube 13. The body has a radially inwardly projecting flange 26 whose inner face 27 provides an axially outer wall for packing chamber 15 and whose outer face 28 provides a transverse abutment for engaging the inner end of sleeve 17 to limit the innermost position of the latter. The nut and body have abutment faces 30, 31, that are engageable to limit the threaded engagement of the nut and body.

Sleeve 17 on its exterior has a cylindrical surface 33 that is a close sliding fit within bore 16, a reduced diameter portion 34, a radiused portion 35, and a frusto-conical portion 36. On its interior, sleeve 17 has a first cylindrical bore 38, a second cylindrical bore 39 with a shoulder 40 at the intersection of the two bores, a radially inwardly projecting sharp sawtooth form rib 31, and an outwardly flaring mouth or frusto-conical surface 42. The sleeve also has longitudinal slots 43 that form a plurality of circumferentially spaced fingers 44. The sleeve is preferably made of tempered brass or some other springy material so that the fingers can be readily flexed radially inwardly and outwardly.

Nut 21 has a bore 46 that is a close sliding fit over tube 13 and it has a chamfer 47 at its outer end and a frusto-conical camming surface 47 at its inner end. When sleeve 17 is bottomed against shoulder 28 the sleeve is out of contact with nut 21 as shown in FIG. 1.

The coupling parts are preferably preassembled before reaching an assembly line where the coupling may be installed by threading into a port 50 of a unit 51 to which tube 13 is to be connected. The tube is then inserted through nut 21 and into the coupling to the position shown in FIG. 1. Because sleeve 17 is readily slidable in bore 16 it may be against nut 21 when the tube first enters the coupling. However, because rib 41 is initially of a diameter slightly smaller than the tube outside diameter it will engage the entering tube and the sleeve will be carried back against shoulder 28.

Figure 2:
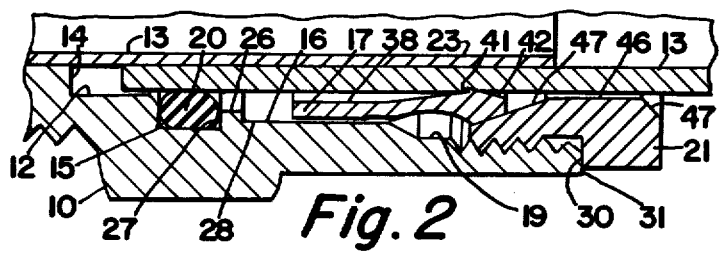
FIG. 2 is a fragmentary section view showing the coupling upon slight withdrawal motion of the tube.
Figure 4:
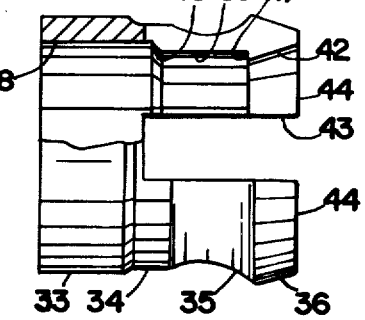
FIG. 4 is a side view of the sleeve.

The tube is inserted until it bottoms on shoulder 14. Now, upon slight withdrawal motion of the tube, either by mechanical pull or by action of internal fluid pressure, as shown in FIG. 2, sleeve 17 will be moved outwardly so that outer surface 36 engages nut cam surface 47 whereupon fingers 44 will be contracted radially inwardly to cause rib 41 to become firmly embedded within tube 13 and tightly grip the tube to hold it within the coupling.

Sleeve 17 has its thinnest cross section between the smallest diameter of the outer concave radius surface and bore 39. Radiused portion 35 permits maximum bending of the fingers in the vicinity of the smallest diameter of portion 35 and yet provides a smooth transition to edge 53, which is the largest diameter of the sleeve, to provide a maximum sleeve thickness at a point approximately opposite rib 41, edge 53 being on a diameter larger than bore 16.

Figure 3:
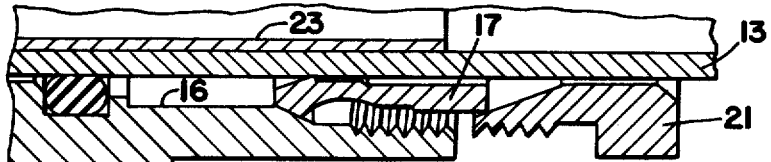
FIG. 3 is a fragmentary section view showing the sleeve backwards.
Figure 6:
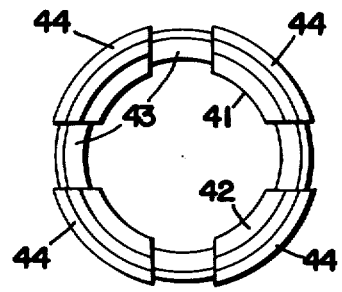
FIG. 6 is an end view of the sleeve.

Because edge 53 is larger in diameter than bore 16, sleeve 17 cannot be inserted backwards into bore 16 during assembly of the coupling components. Also, the length of the threaded connection between nut 21 and body 10 is short so that the threads cannot be engaged if the sleeve is put in backwards. See FIG. 3. This constitutes a safety feature so that the parts cannot be assembled if the sleeve has been put in backwards. Otherwise, the coupling would not function properly if the sleeve is assembled backwards.

Tube 13 is preferably of nylon or some other flexible plastic material that may be readily indented by rib 41 to be gripped thereby. When fluid pressure is within the coupling, packing ring 20 is restrained by shoulder 27 independently of the position of sleeve 17.

Figure 5:
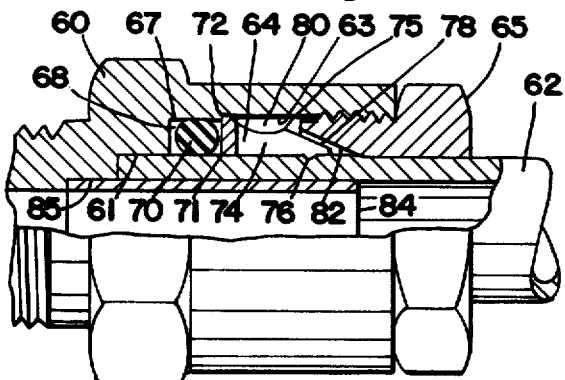
FIG. 5 is a view like FIG. 1 of an optional form of coupling.
Figure 8:
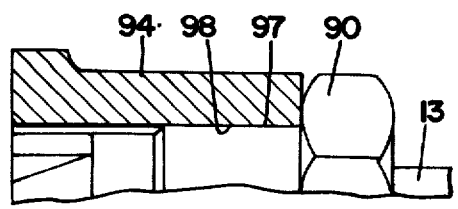
FIG. 8 is a fragmentary view in which the body is a press fit cartridge.

In the form of coupling shown in FIG. 5, body 60 has a first bore 61 that receives tube 62 and has a second bore 63 that receives a sleeve 64. The outer end of bore 63 is threaded to make threaded engagement with a nut 65. Another bore 67 of smaller diameter than bore 63 forms the outer wall of a chamber 68 in which a resilient O-ring 70 is received. Chamber 68 is closed at its outer end by a solid ring portion 71 of sleeve 64, which ring portion seats on a shoulder 72 formed between bores 67 and 63. Sleeve 64 has several circumferentially spaced slots 74 to form a plurality of spring fingers 75 which have a sharp rib 76 projecting radially inwardly and which have tapered exterior surfaces 78 and radiused exterior surfaces 80. Nut 65 has a frusto-conical cam surface 82 that is initially out of contact with surfaces 78 when sleeve portion 71 is against shoulder 72. Rib 76 is initially of slightly smaller diameter than the outer diameter of tube 62. A tube support member 84 is press fitted within body bore 85.

With the coupling parts preassembled, tube 62 is merely pushed into the coupling to the position shown in which it is lightly gripped by rib 76. Upon slight withdrawal motion of tube 62, as by mechanical pull, sleeve 64 is pulled by the tube toward cam surface 82 which engages the outer end of fingers 75 to contract the same in diameter so that rib 76 will bite deeper into the tube to increase the grip thereon. The same effect occurs when there is fluid pressure within the coupling. In such case, the fluid makes its way into chamber 68 to the left side of the O-ring 70 and drives the latter to the right against sleeve portion 71 to move the sleeve toward nut 65 whereby rib 76 is contracted into tight gripping engagement with tube 62.

Figure 7:
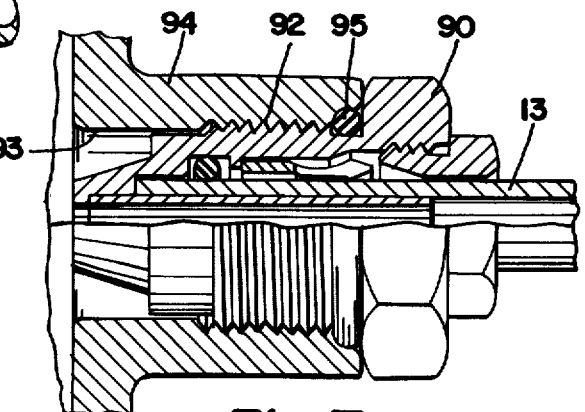
FIG. 7 is a partial section view in which the body is a threaded cartridge.

In the form shown in FIG. 7, body 90 corresponds generally to body 10 of FIG. 1 with the same internal configuration but with a different external configuration and with an external thread 92 so as to be received and threadedly engaged within a threaded bore of a housing 94 or a container, pump, or other device. The cartridge is sealed relative to the housing by a packing ring 95 that may be an elastomeric O-ring or some other form of ring of relatively soft material. Alternatively, cartridge 90 may be provided with a generally cylindrical surface 97 instead of a thread and press fitting into a smooth bore portion 98 in housing 94, and in which case the press fit both retains the cartridge in the housing and also seals it relative thereto.

Figure 9:
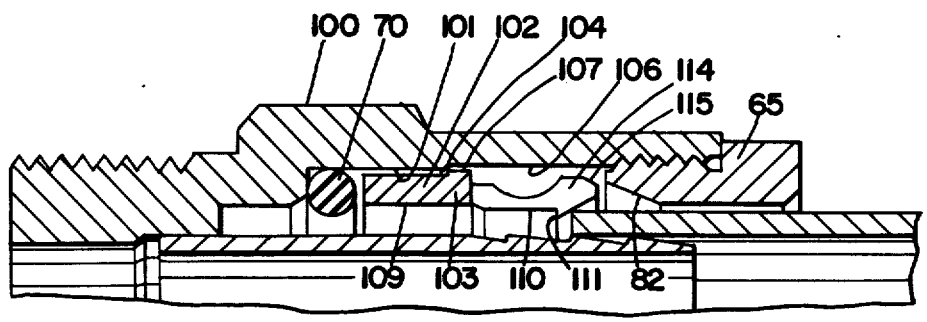
FIG. 9 is a cross section fragmentary view of another form of the coupling prior to insertion of the tube.
Figure 10:
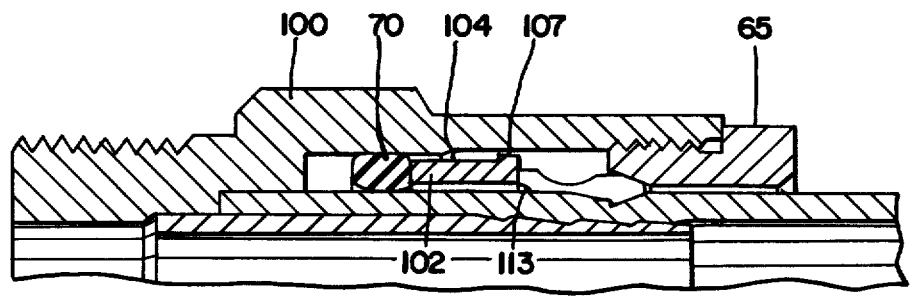
FIG. 10 is a cross section fragmentary view of the FIG. 9 form of coupling when under fluid pressure with the tube inserted.

In the form of coupling shown in FIGS. 9 and 10, the body 100 is similar to body 60 of FIG. 5 except that cylindrical bore 101 that forms the chamber for packing ring 70 is elongated to receive an annular extension 102 on sleeve 103 with a close sliding fit. The outer end of bore 101 is tapered as at 104 that intersects bore 106 and this taper serves as a shoulder against which an annular flange 107 on the sleeve may seat.

In sleeve 103 cylindrical bore 109 is larger than the outer diameter of tube 13, as for example about 0.015" larger for a tube of ¼" O.D. while cylindrical bore 110 is only about 0.005" larger so as to be a close slip fit over the tube. Rib 11 is initially about 0.013" smaller in diameter than a ¼" tube so that it will have an initial grip upon the tube when the tube is inserted into the sleeve.

Sleeve bore 109 extends through flange 107 and terminates at a tapered shoulder 113. Slits 114 extend through the entire length of bore 110 and through tapered shoulder 113 and terminate substantially at flange 107.

When the coupling of FIGS. 9 and 10 is subjected to fluid pressure, the fluid pressure on packing ring 70 moves the packing ring and sleeve 103 outwardly until the outer end 115 of the sleeve is tightly contracted upon the tube by cam surface 82 of nut 65, as shown in FIG. 10. In the final position of the parts, sleeve extension 102 remains within body bore 101 to retain the packing ring 70 in such bore and there are no shoulders over which the packing ring slides which might otherwise result in damage thereto and leakage.

I claim:

1. A preassembled coupling for tubes wherein a final fluid tight joint may be made solely by insertion of a tube therein, said coupling comprising a body having a first bore for receiving a tube, a chamber axially outwardly of and adjacent the first bore and in which a packing ring is received and sealingly engages the tube and a radially outer cylindrical wall of said chamber, a second bore in the body axially outwardly of the chamber and in which a sleeve is received, and an internal thread axially outwardly of the second bore, a transverse shoulder at the bottom of the second bore, a nut threadably engaged with said internal thread, engaged abuttment surfaces on the body and nut fixing the axial position of the nut relative to the body, said sleeve having an inner end wall forming a movable outer wall of said chamber and when there is no fluid pressure in the body being unbiased in either axial direction and being freely moveable between an innermost position and an outer position, said packing ring being subject to pressure of fluid in the inner end of said chamber and moveable thereby into engagement with said sleeve for moving said sleeve to said outer position, said chamber being of an axial length greater than the axial length of the packing when said sleeve is in said innermost position whereby when there is no fluid pressure within the axially inner end of said chamber said packing may move to said inner end and be out of contact with the sleeve when the sleeve is in said innermost position, said nut having a bore therethrough that terminates in a frusto-conical cam surface at the inner end of the nut, said sleeve having a circumferentially continuous inner end surface and an inwardly facing second surface that engages said shoulder when the sleeve is in said innermost position, said sleeve having longitudinal slits at its outer end forming a plurality of circumferentially spaced fingers, said fingers having a radially inwardly projecting rib of smaller diameter then the tube prior to insertion of the tube within the coupling, said fingers having a flare mouth at their outer ends, said sleeve when in said innermost position being out of contact with said cam surface, said sleeve being in engagement with said cam surface when said sleeve is in said outer position whereby the outer ends of said fingers and said rib are contracted radially inwardly by said cam surface and the rib grips the tube for retaining the tube within the coupling.

2. The coupling of claim 1 in which said sleeve inner end wall is on a continuously annular extension integral with the sleeve and extending into said chamber inwardly of said transverse shoulder, said extension having a cylindrical outer surface that is a close slide fit with said radially outer wall of the chamber and having a radially inner cylindrical surface that is a close slide fit over said tube.

3. The coupling of claim 1 in which said sleeve has a first cylindrical bore at its inner end and a second cylindrical bore axially outwardly of the first cylindrical bore, and of a diameter no larger than that of said first cylindrical bore, and said sleeve has its thinnest cross-section dimension radially opposite said second cylindrical bore.

4. The coupling of claim 3 in which said sleeve has an annular flange to provide said inwardly facing surface, said first cylindrical bore extends through said extension and flange, and said slits terminate substantially at said flange.

5. The coupling of claim 3 in which prior to said radially inward contraction said second cylindrical bore is of a diameter that is a close slip fit over said tube and said rib is of a diameter smaller than the diameter of said tube, and said slits extend throughout the length of said second cylindrical bore.

6. The coupling of claim 4 in which said first cylindrical bore ends at a tapered transverse shoulder that intersects said second cylindrical bore, and said slits extend through said tapered transverse shoulder.

* * * * *